Figure 2:
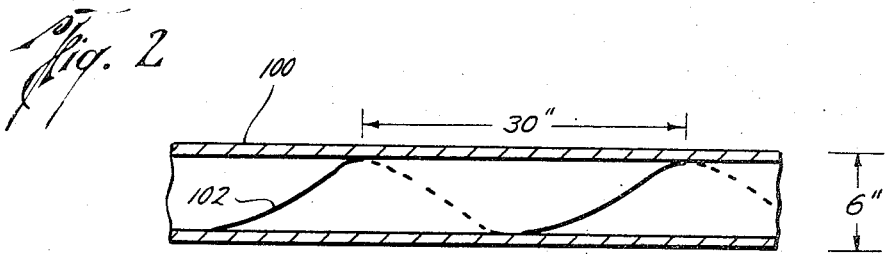

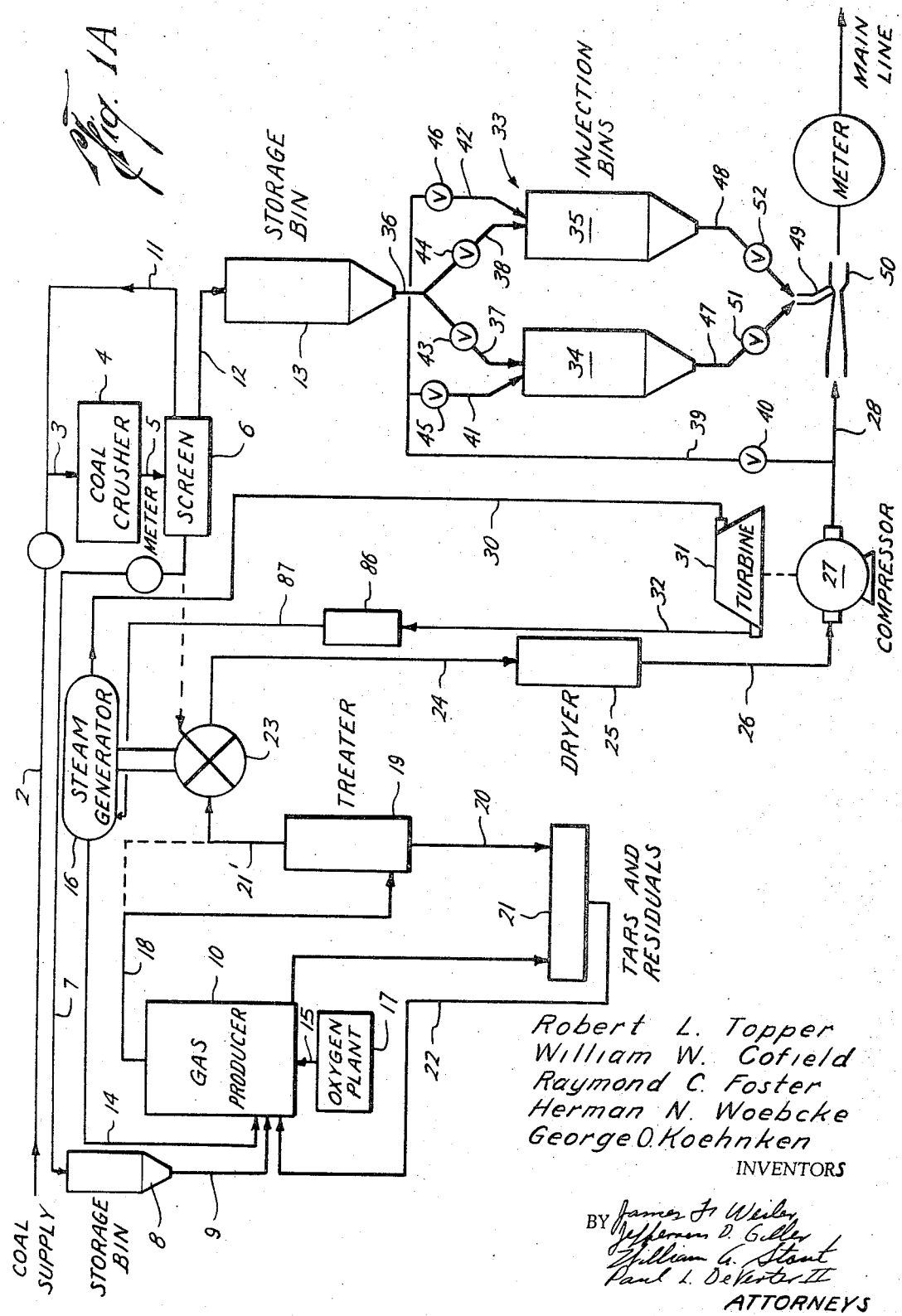

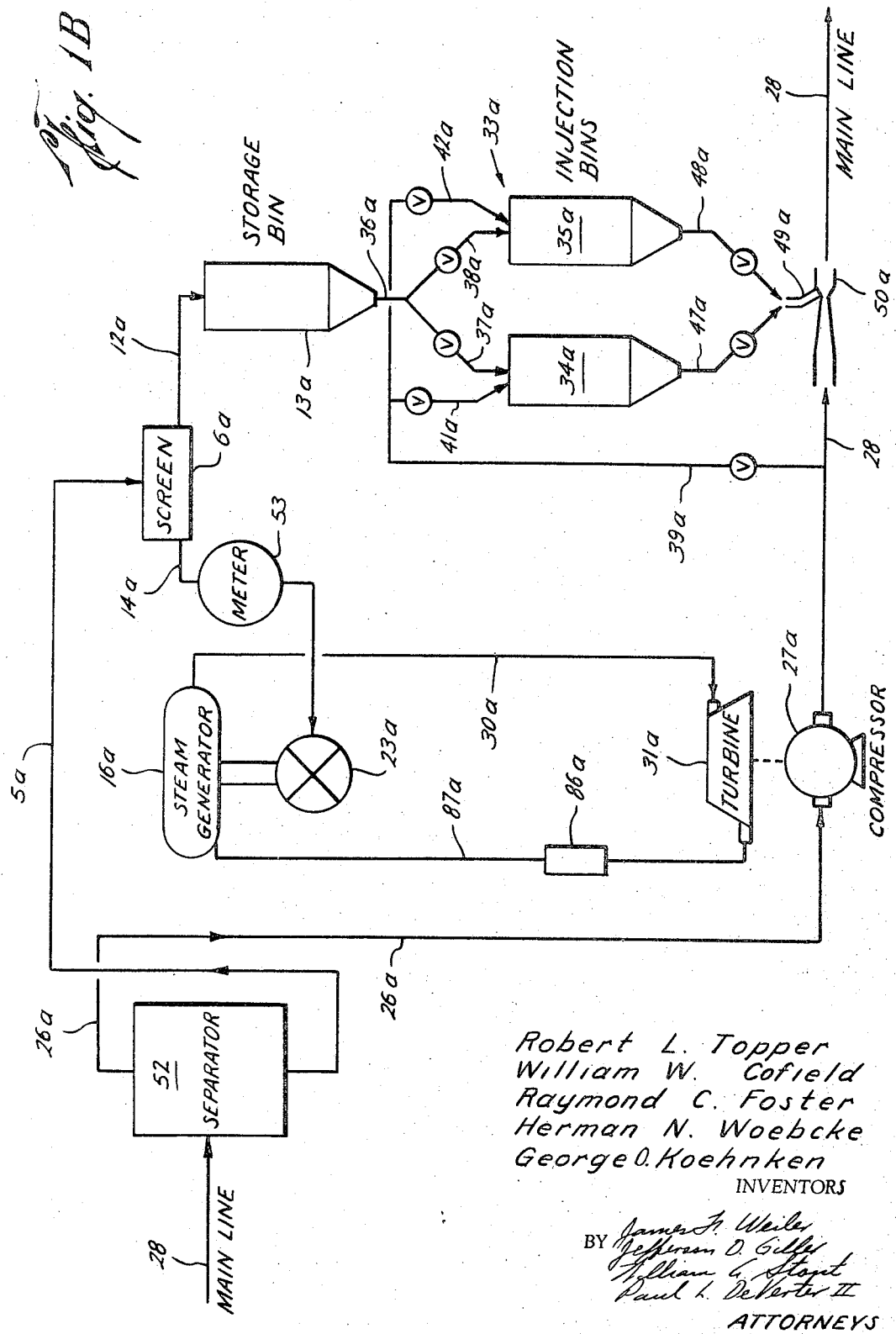

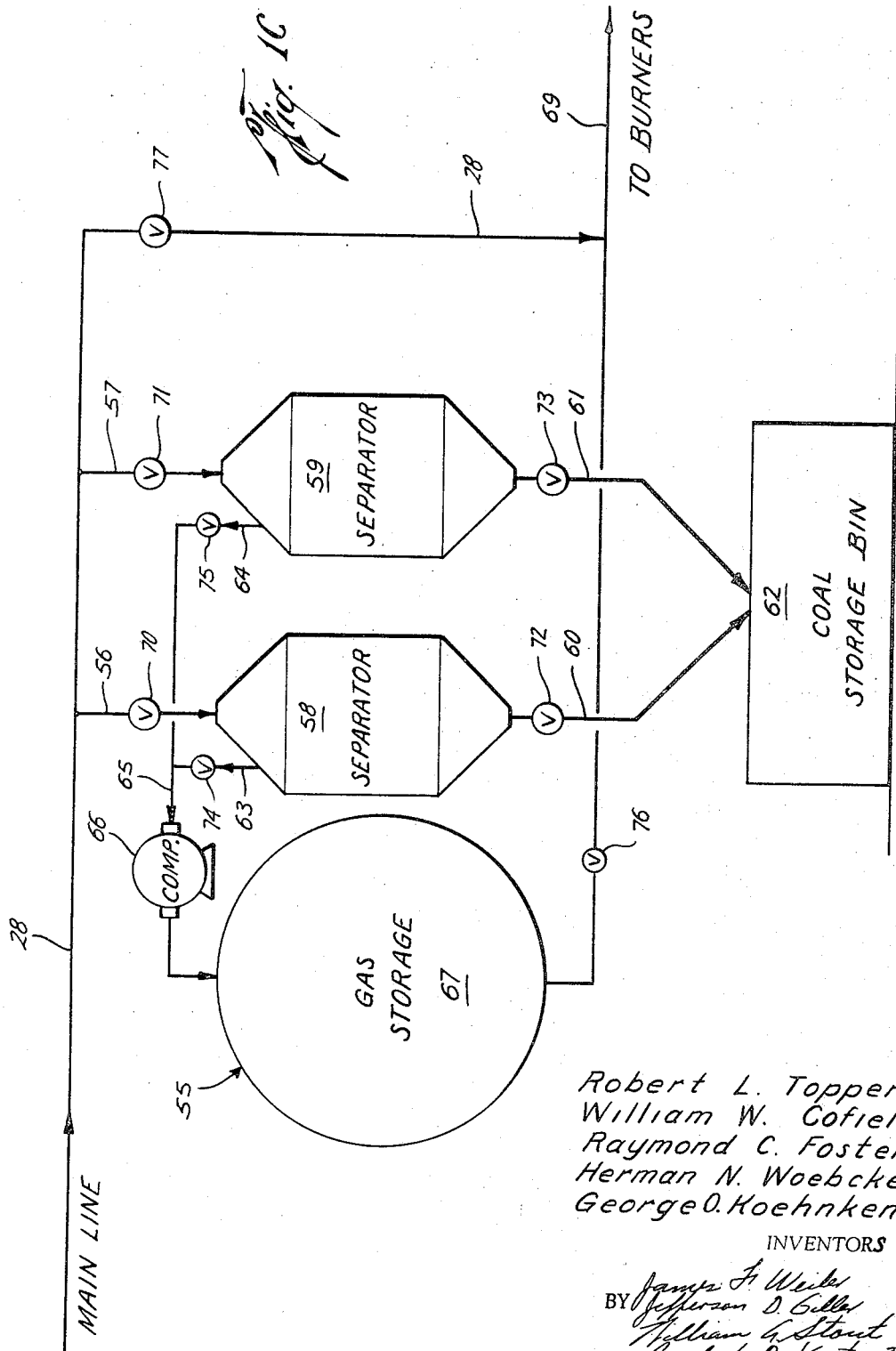

Oct. 17, 1967  R. L. TOPPER ET AL  3,347,599
METHOD OF TRANSPORTING GRANULAR SOLIDS IN A GAS
Filed April 26, 1965  6 Sheets-Sheet 4

Robert L. Topper
William W. Cofield
Raymond C. Foster
Herman N. Woebcke
George O. Koehnken
INVENTORS

BY
ATTORNEYS

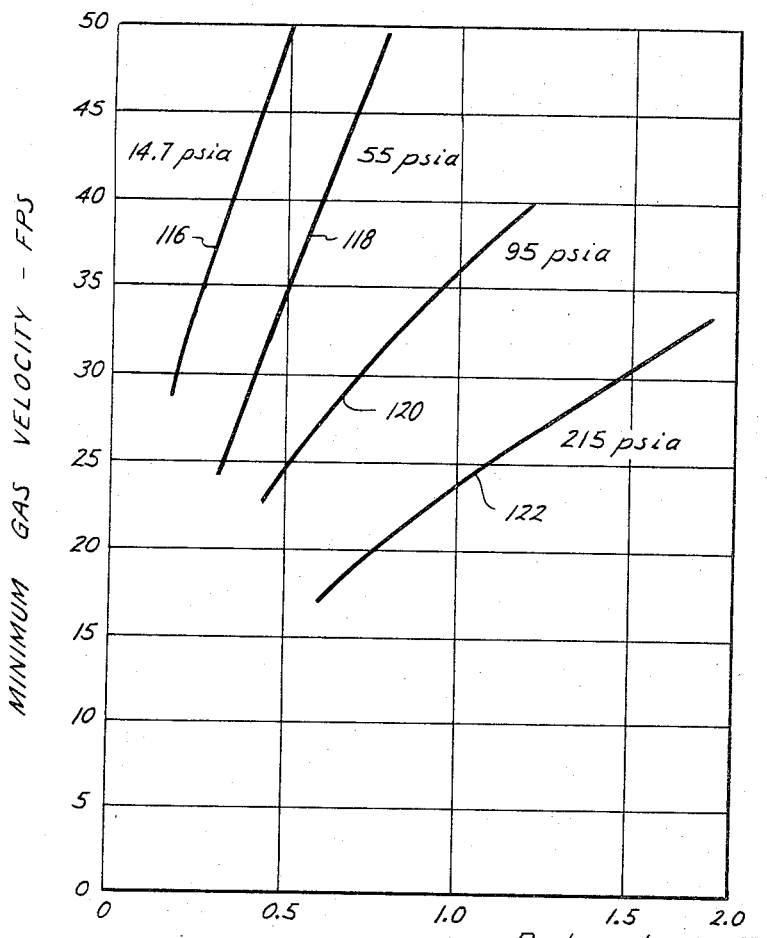

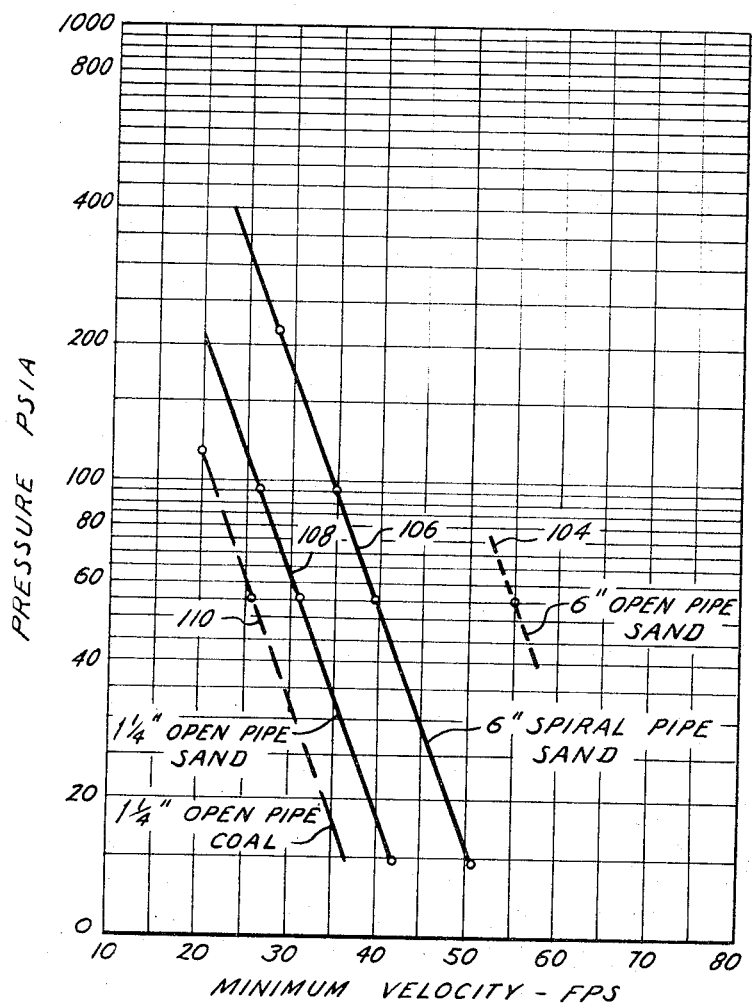

united States Patent Office 3,347,599
Patented Oct. 17, 1967

3,347,599
METHOD OF TRANSPORTING GRANULAR
SOLIDS IN A GAS
Robert L. Topper and William W. Cofield, Houston, Tex., Raymond C. Foster, Garden City, N.Y., Herman N. Woebcke, Waltham, Mass., and George O. Koehnken, Garden City, N.Y., assignors, by direct and mesne assignments, to Transcontinental Gas Pipeline Corporation, Houston, Tex., a corporation of Delaware
Filed Apr. 26, 1965, Ser. No. 450,804
6 Claims. (Cl. 302—66)

The present invention relates to a method of transporting granular materials through a conduit in a gas.

In the past, pulverized coal, coke, cement, chemicals, ores, and other solids, have been moved in pipelines using pneumatic forces. However, the movement of these materials have been for only short distances and low pressures. Furthermore, because of the many separate variables involved, there has not been a lot of reliable information for the design of a commercially feasible gas-solid transport pipeline.

Therefore, it is a general object of the present invention to provide a method of transporting granular materials in commercial quantities through pipelines by utilizing a carrier gas.

A still further object of the present invention is the provision of a method of transporting granular materials through a conduit in a gaseous carrier by selecting operating parameters which will not provide a practical system but one which will require a minimum of energy consumption for operation.

Many problems are involved, however, in conveying or transporting pulverized granular materials by gaseous carriers in pipelines. Among these are the so-called "saltation effect" or settling out of the solid particles in the pipeline. For example, a gaseous suspension of particles requires certain minimum velocities to maintain them in suspension and to prevent them from settling out or salting out in the pipeline. Other problems found are that granular solids are generally conveyed in slugs or ripples which create very large pulsations and pressure drops in the conduit.

The present invention is based upon the discovery that by properly selecting, within narrowly defined limits, the ranges of pressures, particle size, velocity, and other operating parameters not only the operating problems can be overcome, but they may be overcome to the extent that solid materials may be transported through pipelines with significantly minimized operating costs.

A still further object of the present invention is the provision of a method of not only preventing saltation, but reducing pulsation and pressure drops by increasing the ratio of the solids velocity to the gas velocity by periodically propelling the solids into the center of the pipeline and thus into the high velocity gas stream.

Yet a further object of the present invention is the provision of a method of transporting commercial quantities of coal in pipelines by a carrier gas in which the so-called "fines" or smaller particles in the main stream are periodically separated therefrom and utilized to provide energy for conveying the coal and carrier gas through the pipeline.

A further object of the present invention is the provision of a method of transporting granular materials in a carrier gas in commercial quantities through pipelines of long distance at reduced power requirements and cost by properly selecting, within the limits hereinafter set forth, the velocity, pressure levels, particle size, and the maximum carrying capacity of the gas.

Figure 3:
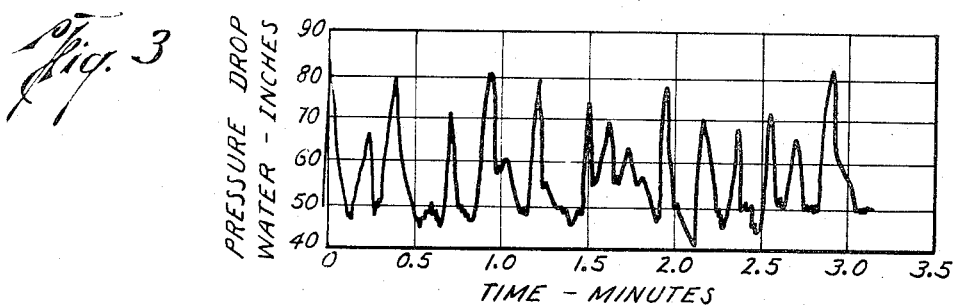
Figure 4:
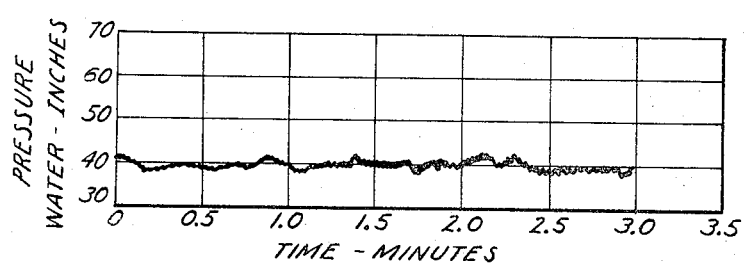
Figure 7:
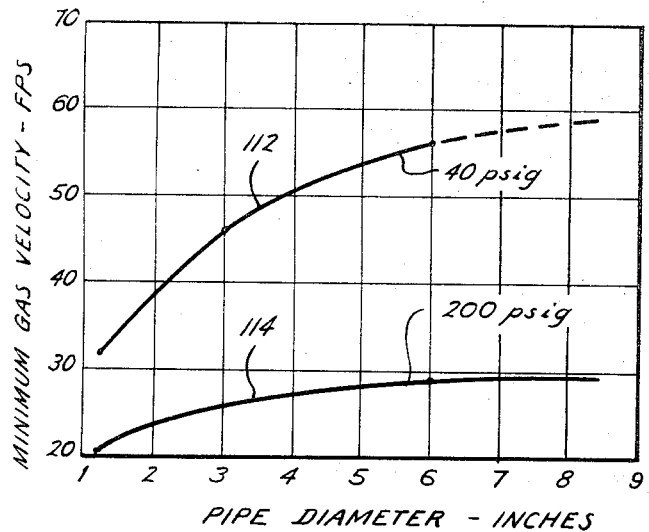

Other and further objects, features and advantages will be apparent from the following description of an apparatus useful in the methods of the invention, given for the purpose of disclosure, and taken in conjunction with the accompanying drawings, where like character references designate like parts throughout the several views, and where, FIGURE 1A illustrates a coal transportation system according to the invention illustrating the preparation and use of producer gas as the carrier and injection of the pulverized coal into the pipeline, FIGURE 1B illustrates a compressor system according to the invention for compressing the gas at intervals along the main line as desired, FIGURE 1C is a continuation of FIGURE 1B and is a schematic representation of a discharge station for the transported coal according to the invention, FIGURE 2 is an elevational view, in cross section, illustrating one form of a pipeline for propelling the granular solids into the high velocity gas stream in the center of the pipeline, FIGURE 3 is a chart showing the pressure drop in a conventional pipeline, FIGURE 4 is a chart showing the pressure drop in a pipeline having the configuration shown in FIGURE 2, FIGURE 5 is a chart illustrating the relationship between gas pressure and minimum gas velocity at various ratios of granular solid loading to gas, at various pressures, FIGURE 6 is a graph showing the relationship between pressure and minimum gas velocity of various sizes and configuration of conduit and different types of granular solids, and FIGURE 7 is a chart illustrating the relationship between pipe diameter and the minimum gas velocity at various pressures.

As previously mentioned, a theoretical understanding of the problem of granular solid transportation through a conduit in a gaseous carrier is complicated by the fact that as many as eight separate variables are normally evaluated. And any attempt to establish the interrelationship of these variables is difficult because of the fact that any practical granular solids contain a wide range of particle sizes, and the fact that the gas velocity varies across the pipe diameter from essentially zero at the pipe wall to a value higher than the average in the center of the pipe. While the velocity distribution can be calculated quite precisely for gas alone, the introduction of solid particles will change this profile. Experiments have shown that the solids are not distributed uniformly across the pipe cross section and in general the highest concentration of solids will exist below the center of the pipeline. Under some conditions, a very dense solid stream will flow along the bottom of the pipe. Thus, the velocity of the solids differs from the gas and is primarily concentrated in the pipeline at a position which would cause saltation and has been found to cause very large pulsations and pressure drops along the pipeline.

Referring now to FIGURE 3, a typical pressure graph is shown for a conventional smooth wall conduit which shows the very large pulsations and pressure drops which occur when granular materials are flowed through a pipeline in a gaseous carrier under normal conditions. For example, the graph in FIGURE 3 illustrates that the variation between maximum and minimum pressure drop for a run in a six inch pipe amounted to 36 inches of water while the average pressure drop was 53 inches of water. Of course, both the pulsations and the pressure drops reduce the efficiency of the transportation system.

However, it has been found that the highest concentration of solids will exist below the center of the longitudinal axis of the conduit or pipeline. Therefore, since the velocity of the gas is greater than the velocity of the granular materials suspended in the gaseous carrier, it would be desirable to flow the solids up into the center of the pipeline into the higher velocity gas. For one thing, this would have an advantageous effect of helping to prevent saltation by increasing the velocity of the granular solids and also guiding them away from the low velocity region adjacent the pipe wall.

Referring now to FIGURE 2, a conventional conduit or pipeline 100 is shown in which a spiral guide 102 such as a spiral wire suitably connected and helically positioned to the interior of the conduit 100 is shown. For example, in a six inch pipeline the distance of the helix could be approximately 30 inches. It has been found that the provision of such a spiral guide on the interior of the conduit or pipeline 100 will have the effect of propelling the granular solids up to the longitudinal axis or center of the pipeline 100 and into the high velocity gas stream. However, in addition to increasing the velocity of the granular solids and overcoming the problem of saltation, it has been found that the spiral guide 102 overcomes the pulsation problem and decreases the pressure drop which was shown in FIGURE 3 as applied to smooth bore pipe. For example, and referring to FIGURE 4, a pressure drop chart is shown for six inch pipe under the same operating conditions as shown in connection with the graph in FIGURE 3. However, with the use of spirals in the pipe the fluctuation of pressure drop was reduced to four inches of water and the average pressure drop was reduced to 39 inches of water at the same solid flow rate and pressure levels as smooth bore pipe.

Of course, in attempting to provide operating conditions suitable for commercial use, it is necessary not only to provide parameters which will provide suspension of the solids in the gas, but it is necessary to reduce energy consumption as much as possible in order to provide a system which will be economically feasible. As prior literature suggested that the solids pressure drop would vary with the square of the gas velocity in common with other fluid systems, considerable emphasis has been directed at measuring the minimum velocity which could be used for a given loading without saltation occurring in order to determine the condition of economic interest, that is, that velocity giving the lowest total pressure drop. However, we have found that the solids pressure drop was surprisingly insensitive to the gas velocity and accounted for on the average for only about 10% of the measured pressure drop. Therefore, as to the parameter of gas velocity, it is of primary interest in determining what minimum gas velocity is necessary to keep the granular solids in suspension in the gaseous carrier and thus preventing them from falling out of suspension into the pipeline thereby causing increasing pressure drop and possibly blocking the pipeline. Generally, as can best be seen in FIGURE 6, the preferable range for minimum gas velocity falls within the range of 10 to 50 feet per second depending upon other operating conditions as will be more fully discussed hereinafter.

Referring to FIGURE 6, the relationship between minimum gas velocity required and the pressure level in various types of pipes and materials, all of a 50 mesh particle size and at a solid loading of 0.4 pound per cubic foot of gas, is best seen. One important fact shown by this graph is that increasing the pressure level results in a very significant reduction in minimum velocity. It is to be noted that by selecting an operating pressure of 100 pounds per square inch absolute that the relationship between the pressure and the minimum velocity is such that the minimum velocity is suitably reduced so as to obtain optimum economic operating conditions. However, this chart shows that by increasing the operating pressures much above 100 p.s.i.a. doesn't reduce the minimum velocity to any significant amount. However, it is also significant to note from the graph in FIGURE 6 the difference in the minimum velocity requirements for a six inch smooth bore pipe as shown by line 104 and the minimum velocity requirements in a six inch spiral pipe 100 (FIGURE 2) as indicated by the graph 106. Thus, for example, at 55 pounds per square inch the minimum velocity requirement for the smooth bore pipe is 55 feet per second while for the spiral pipe the minimum velocity requirement is only approximately 40 feet per second. This again shows the superiority of propelling the granular solids into the center of the pipe and into the higher velocity gases.

Another unexpected result of operating parameters came from investigating the effect of pipe diameter on the operating conditions. Theoretical indications show that the solids pressure drop for given operating conditions would decrease as the pipe diameter increased. However, and referring to FIGURES 6 and 7, it is noted from these graphs that the minimum velocity actually increases as the pipe diameter increases. For example, the difference in the charts 104 and 110 in FIGURE 6 and as shown in curve 112 in FIGURE 7 shows that the minimum velocity at 55 p.s.i.a. had to be increased from 30 feet per second to 55 feet per second as the pipe diameter is increased from 1.25 inches to 6 inches at a constant loading. Thus, contrary to expectations, this investigation shows a considerable increase in minimum velocity and pressure drop is required as the pipe size is increased for a given set of flow conditions particularly at the lower operating pressures. This increase in minimum velocity produces an increase in pressure drop. However, again referring to FIGURE 7 the effects of increasing the pipe diameter can be overcome or at least minimized by increasing the operating pressure. Thus, interpolating between lines 112 and 114 in FIGURE 7 it is seen that by using a pressure of 100 p.s.i.g. as compared with 40 p.s.i.g. as shown in curve 112 will reduce the required minimum velocities below 50 feet per second and thus will reduce the pressure drop. This again shows the economic advantage of operating at approximately 100 p.s.i.g. over lower pressures. This data is consistent with the concept that the settling of solids in a pipe occurs first in the low gas velocity region next to the pipe wall. That is, as the pipe diameter is increased, the gas velocity at a given distance from the pipe will decrease for a given bulk gas velocity. As a specific example, if the average gas velocity is 15 feet per second, then the velocity 0.02 inches from the pipe wall will be 8 feet per second in a 1.25 inch internal diameter pipe, and 3½ feet per second in a 30 inch internal diameter pipe.

The next operating parameter that was investigated was the effect of solids loading, that is, the concentration of pounds of granular solids per cubic foot of gas. Referring now to FIGURE 5, curves 116, 118, 120, and 122 show the effect of solids loading and pressure levels on the gas velocity having a minimum pressure drop, or the minimum gas velocity, at 14.7 p.s.i.a., 55 p.s.i.a., and 215 p.s.i.a., respectively. As indicated by the graphs increasing the solids loading requires an increase in the minimum gas velocity, this effect being most pronounced at low pressures. Therefore, increasing the pressure level, such as shown in curve 122, at a given solids loading results in a very significant decrease in minimum velocity. Thus, it is again noted that by the use of a pressure in the range of 100 p.s.i.a., that variances in the loading will not have as great adverse effect on the required minimum gas velocity as will the use of lower pressures.

Another parameter which affects the solids pressure drop is the size of the particles of the solids being carried by the gas. Generally, it has been found that by decreasing the size of the particles a reduction in the solids pressure drop is obtained. For example, decreasing the size of the particles from 50 mesh to 300 mesh caused a reduction in pressure drop by a factor of about 2. However, from an economic point of view the reduction in transport energy consumption for the smaller particles is obtained at the expense of an increase in power consumption to prepare these finer solids in that the grinding power will increase in preparing the smaller particles for transportation. Therefore, in balancing the desire to obtain the lowest possible pressure drop by using finer particles against the required power for producing those particles it has been found that the particle size should be within the range of 50 mesh to about 300 mesh.

Preferably, the granulated solids in the particle size indicated is carried by the carrier gas in an amount so that the gas is nearly saturated. Preferably, there should be about one to ten pounds of solids, depending upon the operating pressures and velocity as heretofore indicated, and within the particle range specified, per pound of carrier gas. Thus, the amount of capital investment (which varies with the pipe diameter) can be reduced by increasing the loading under proper pressures and velocities.

Therefore, as previously mentioned by properly selecting the parameters of the operating characteristics a practical method of transporting granular solids in a carrier gas can be provided wherein the energy consumption would be at an optimum level in order to allow this transportation system to compete with other conventional methods of solid transportation. That is, by having an operating gas pressure of substantial 100 p.s.i.g., a minimum gas velocity of greater than 10 feet per second and a particle size in the range of 50 to 300 mesh will provide such a system. In addition, by periodically propelling the granular solids upwardly and into the higher velocity gases in the center conduit the problems of saltation and energy losses due to pulsations and increased pressure drops would be minimized.

Of course, any suitable gas which is conveniently available may be utilized to carry many and various types of particulate solid material. By way of example only and referring to FIGURES 1A, 1B and 1C, an apparatus is illustrated for providing a coal transportation system which illustrates the preparation and use of a producer gas as a carrier gas and the injection of the pulverized coal into the pipeline.

Thus, a coal supply enters the system in line 2, and by line 3 is transmitted to a coal crusher 4 of any conventional type which crushes the coal within the particle range previously specified, the crushed coal passing by the line 5 into the screen 6 to prevent coal of a particle size above that of the size range from passing into the system. The crushed or particulate coal below the size range is passed by line 7 into the storage bin 8 and from the storage bin 8 by the line 9 into the gas producer 10. Oversize coal from the screen 6 is passed back to the coal crusher by the line 11. Coal within the specified size range is transmitted from the screen 6 by the line 12 into the storage bin 13 for injection into the pipeline as later explained.

In making the producer coal gas, steam and oxygen or air are introduced to the gas producer 10 by the lines 14 and 15 from the steam generator 16 and oxygen plant or source 17, respectively. If desired, the producer gas may be passed from the gas producer 10 through the line 18 through a treater 19 for the removal of tars and residuals and by line 20 are passed into the sump 21 and are then returned by the line 22 into the gas producer 10 for reuse as fuel in the production of the carrier gas. The treated coal gas from the treater 19 is passed by the line 21 into the boiler 23 for providing steam in the steam generator 16, and by the line 24 to the dryer 25 for drying the gas. The dried gas is passed from the dryer 25 through the line 26 to the compressor 27 which compresses it to the desired carrier gas operating pressure, as previously set forth, from which it is introduced into the main line or pipeline 28 to serve as a carrier for transporting the coal. The oxygen plant 17, boiler 23, dryer 25 and compressor 27 may be of any conventional type which is available on the market.

Preferably the steam energy for driving the centrifugal compressor 27 is obtained from a portion of the carrier gas to be transported in coal from the screen 6. For this purpose, steam from the steam generator 16 is passed through the line 30 to steam turbine 31 and returned by the line 32 to the condenser 86 and condensate is returned from the condenser 86 to the generator 16 through the line 87.

The coal injection system is generally designated by the reference numeral 33 and includes a pair of injection bins 34 and 35 which receive the stored coal from the storage bin 13 by the discharge line 36 and branch lines 37 and 38, respectively. In order to assist in injecting the coal into the pipeline 28, gas under pressure is cut off from the discharge line 28 by means of the line 39 provided with the valve 40, from which extend the branch lines 41 and 42 providing a flow of pressure into the injection bins 34 and 35, respectively. Suitable valves 43, 44, 45 and 46 are provided in the lines 37, 38, 41 and 42, respectively. The discharge lines 47 and 48 are provided from the injection bins 34 and 35, respectively, which lead into a common injector line 49 extending into the venturi 50 in the main pipeline 28 by which the coal in the particle range previously set forth is injected into the main line 28. Suitable valves 51 and 52 are provided in the injection bin discharge lines 47 and 48.

The various valves may be of any suitable type and operated so that the pressure is applied alternately into the injection bins 34 and 35 while the other of these bins is being filled so that the coal is injected by means of the venturi into the main line 28.

Depending upon the length and diameter of the pipeline it is necessary to provide a number of compressor stations for compressing the gas to bring it up to the initial or desired operating pressure because of the pressure drop in moving the carrier gas and coal particles along the line. Advantageously, in order to avoid erosion of the compressor equipment and attrition or deterioration of the coal particles, the coal is separated from the gas, and the gas is then compressed, and the coal is reinjected into the compressed gas for further transportation into the main or pipeline. Thus, for example, when the pressure in the main line drops below 100 p.s.i.g., the coal is separated from the carrier gas, the gas is compressed preferably to a pressure of about 200 p.s.i.g. and the coal is reinjected into the compressed gas in the main line. In such an operation, advantageously the fines or particles of coal below the specified particle limit of 300 mesh are separated from the other coal particles and utilized to provide energy for driving the compressor. Such an arrangement is illustrated in FIGURE 1B.

Referring now to FIGURE 1B, in which the reference letter "a" has been added to parts corresponding to those of FIGURE 1A, an intermediate compressor station according to the invention is illustrated. The main line passes into a suitable separator 52 which separates the coal from the carrier gas. The separated coal is passed in the line 5a to the screen 6a for screening the fines or coal particles below the minimum size of 300 mesh, the fines being passed by the line 14a provided with the meter 53 into the boiler 23a for production of steam as described in connection with FIGURE 1A.

The separated gas in the separator 52 is taken off adjacent the top of the separator 52 and passed by the line 26a to the compressor 27a where it is compressed to the desired pressure, preferably 200 p.s.i.g.

The coal particles, having the fines removed, are passed from the screen 6a and the line 12a into the storage bin 13a for reinjection into the carrier line in the mainline or pipeline as previously described.

The remaining parts and methods are the same as described in connection with FIGURE 1A and no detailed description thereof is deemed necessary.

It is noted, however, that advantageously the carrier gas is compressed without the particles of gas being present which thereby eliminates wear on the compressor and attrition or deterioration of the coal particles. In addition, the fines of coal which are produced by attrition of the particles while flowing in the pipeline are separated out and are utilized to provide energy for the compressor station. This also maintains the coal particles within the particle size range set forth and prevents a large accumulation of small particles or fines.

Referring now to FIGURE 1C, a discharge station, generally indicated by the reference numeral 55 is illustrated. A pair of branch lines 56 and 57 are provided off the main line 28 which lead into the separators 58 and 59, respectively. These separators separate the coal from the carrier gas. The coal from the separators 58 and 59 are discharged into the discharge lines 60 and 61, respectively, into the storage bin 62 for use as desired.

The carrier gas is taken off overhead from the separators 58 and 59 by the lines 63 and 64, respectively, which pass into the common line 65, and pass through the compressor and into the gas storage means 67 for storage. Gas from the tank 67 is passed by the discharge line 68 into the line 69 for supply as a carrier gas to the burners, not shown, of the consumer.

As illustrated, the valves 70 and 71 are provided in the lines 56 and 57, respectively; the valves 72 and 73 are provided in the lines 60 and 61, respectively; the valves 74 and 75 are provided in the lines 63 and 64, respectively; and the valve 76 is provided in the carrier gas discharge line 68.

The method of the present invention is apparent from the foregoing description. However, the method comprehends the process of transporting granular solids through a conduit and a gaseous carrier comprising the steps of injecting granular solids of a particle size from about 50 to 300 mesh into a carrier gas and pumping the combined carrier gas and granular solids through the conduit by compressing the carrier gas to pressures of greater than 100 p.s.i.g. The method further comprehends periodically propelling the solids from the lower portion of the conduit into the center of the conduit and into the higher velocity gas. The method further comprehends moving the combined carrier gas and granular solids through the conduit at a minimum velocity of greater than ten feet per second. The method further comprehends injecting granular solids of a particle size from about 50 to 300 mesh into a carrier gas and pumping the carrier gas and solids through a conduit in pressures from the range of about 100 p.s.i.g. to about 500 p.s.i.g. and moving the solids through the conduit at a minimum velocity in the range of 10 feet to 50 feet per second.

The method further comprehends the transportation of coal in a pipeline where the coal is introduced into a carrier gas and an intermediate compressor station the step of separating the coal and gas is performed, compressing the separated gas, separating the particles of coal smaller than about 300 mesh from the remainder of the coal, utilizing the separated particles for at least part of the energy and compressing the gas, and injecting the coal of a particle size larger than about 300 mesh into the compressed gas.

While the present invention is particularly applicable to the transportation of coal long distances in pipelines and the compression of carrier gas carrying coal in long pipelines, it is of course, applicable to the conveyance and transmission of other solid particulate matter within any suitable gas carrier for any distances.

The present invention, therefore, is well suited and adapted to attain the objects and ends and has advantages and features set forth as well as others inherent therein. While a presently preferred embodiment of the invention has been given for the purpose of disclosure, changes in the structures illustrated and steps in the method may be made which are within the spirit of the invention and the scope of the appended claims.

What is claimed is:

1. In a system of transporting coal in a pipeline in which the major portion of such coal is introduced into a carrier gas, the improvement comprising,
    separating the coal and the gas,
    compressing the separated gas,
    separating the particles of coal smaller than about 300 mesh from the remainder of the coal,
    utilizing the separated particles smaller than 300 mesh for at least part of the energy and compressing the gas as aforesaid, and
    injecting the coal of a particle size larger than about 300 mesh into the compressed gas.

2. A method of transporting coal through a pipeline comprising,
    injecting coal in particle size of the order of about 50 to 300 mesh into a carrier gas,
    pumping the combined carrier gas and coal through a pipeline,
    separating the coal from the carrier gas,
    compressing the gas to a pressure of from about 100 p.s.i.g. to about 500 p.s.i.g.,
    injecting the separated coal into the compressed gas,
    removing the separated coal particles of a size less than 300 mesh, and
    utilizing the separated particles of less than about 300 mesh for at least part of the energy and compressing the gas as aforesaid.

3. A method of transporting coal through a pipeline comprising,
    continuously injecting coal in the particle size of the order of 50 mesh to about 300 mesh into a carrier gas,
    pumping the combined carrier gas and coal through the pipeline at a minimum velocity greater than 10 feet per second under a pressure of at least 100 p.s.i.g. and periodically recompressing the carrier gas by
    separating the coal particles and the carrier gas,
    compressing the separated gas, reinjecting the separated coal particles of greater than 300 mesh into the recompressed carrier gas, and
    utilizing the separated particles less than about 300 mesh for at least part of the energy in recompressing the gas.

4. A method of transporting granular solids with a minimum of power to distant locations through a generally horizontal pipeline in a gaseous carrier comprising,
    injecting granular solids of a particle size in the range from about 50 to 300 mesh into a carrier gas in which the granular solids are added to the carrier gas up to a weight ratio of 10 to 1 to the gas,
    pumping the combined carrier gas in the granular solids through the pipeline by compressing the carrier gas to pressures from about 100 p.s.i.g. to 500 p.s.i.g.,
    moving the solids through the pipeline at a minimum velocity in the range of 10 to 50 feet per second.

5. The method of claim 4 including the step of, without increasing the pressure drop in the pipeline, periodically propelling only the solids at the side of the pipeline to the center of the pipeline.

6. A method of transporting granular solids to distant locations through a generally horizontal pipeline in a gaseous carrier comprising,
    injecting granular solids of a particle size from about 50 to about 300 mesh into the carrier gas in which the granular solids are added to the carrier gas up to a weight ratio of 10 to 1 to the gas,
    pumping the combined carrier gas and the granular solids through the pipeline by compressing the carrier gases to pressures from about 100 p.s.i.g to 500 p.s.i.g.,
    moving the solids through the pipeline at a minimum velocity in the range of 10 to 50 feet per second,
    when the pressure in the pipeline falls substantially below 100 p.s.i.g. separating the solids from the carrier gas and removing the solids from the pipeline, recompressing the separated gas to over 100 p.s.i.g., and reinjecting the separated solids into the pipeline and into the compressed gas by applying gas pressure to the solids.

References Cited

UNITED STATES PATENTS

| | | | |
|---|---|---|---|
| 149,114 | 3/1874 | Grieser | 302—24 |
| 1,451,272 | 4/1923 | Robinson | 302—14 |
| 1,662,178 | 3/1928 | Yulle | 302—14 |
| 2,957,727 | 10/1960 | Allen et al. | 302—17 |
| 3,075,559 | 1/1963 | Sharp et al. | 302—64 |
| 3,168,350 | 2/1965 | Phinney et al. | 302—14 |

ANDRES H. NIELSEN, *Primary Examiner.*